Feb. 13, 1951     L. R. SHARDLOW     2,541,838

WATER RESISTANT POROUS MEDIUM

Filed June 12, 1947

INVENTOR.
LAWRENCE R. SHARDLOW

BY William A. Zalesak
ATTORNEY

Patented Feb. 13, 1951

2,541,838

UNITED STATES PATENT OFFICE 2,541,838

WATER RESISTANT POROUS MEDIUM

Lawrence Russel Shardlow, North Arlington, N. J., assignor to Radio Corporation of America, a corporation of Delaware Application June 12, 1947, Serial No. 754,159

5 Claims. (Cl. 183—44)

The present invention relates to filters of the type constituted of a porous body and more especially to filters of this type designed to permit the flow of gases therethrough and serving as a stop means for the flow of liquids, and to a novel method of manufacture of such filters.

A porous body is well suited as a filter, since the minute inter-communicating spaces therein provided serve as a screening medium. Thus, if it is desired to remove solid particles of predetermined dimensions from a liquid, the liquid is caused to flow or pass through a porous body having pores of smaller dimensions than those of the solid particles. However, if it is desired to employ a filter of this type for the flow of gases therethrough and as bar to the flow of liquids, many difficulties are encountered.

For example, while the spaces provided in the pores of such bodies are usually small enough to prevent the free flow of a liquid therethrough, the walls of the spaces are readily wetted by liquid, such as water. In the presence of such wetting a mere diminution of the dimensions of the pores will be ineffective to bar passage of liquid therethrough because of the interaction of the surface tension of the liquid with the walls of the pores which is characteristic of capillary action.

An attempt to meet this difficulty immediately gives rise to others. Thus, while it is recognized that the capillary action of the liquid in the pores can be prevented by making the walls non-wettable by the liquid, such for example as by coating the body and the walls of the pores with a non-wettable medium, several objections to this procedure make themselves manifest.

One objection concerns the requirement that the coating adhere to the surfaces over appreciably long periods of time. Most oils that are suggested for use in this connection dry up in a relatively short time and lose their characteristic of freedom from wetting. Another objection resides in the tendency of the oil to close the pores of the filter body. This is particularly true where a paraffine is used. The use of a paraffine for coating the walls of the pores has advantages in that its viscosity can be considerably reduced by the application of heat so that it readily enters the pores. Then on cooling it forms a relatively hard coating that permanently adheres to the pore surfaces. But the objection to the use of paraffine is that it hardens relatively fast on coming in contact with the relatively cool walls of the pores, and this results in the formation of a relatively thick coating on the pore walls, at least at locations adjacent the external surfaces of the filter body. The thickness of the coating may be thus built up to such a magnitude as to bridge the space between opposite pore walls and render the filter body useless as a filter.

Another problem associated with a filter designed to pass gases but to block the passage of liquids therethrough results from the fact that the filter may be required to block the flow of liquids at varying pressures. Thus some uses to which a filter of this sort may be put involves a constant contact with a liquid. Other uses may subject the filter to only occasional contacts with liquids. A filter having a pore size for blocking liquids at a maximum pressure, would not be serviceable with higher pressures. While a filter may operate satisfactorily to prevent capillary passage of liquids therethrough, it is possible that the pressure of the liquid may be such as to mechanically force the liquid through the pores thereof as if the pores were orifices.

It is accordingly an object of the invention to provide a filter that effectively blocks liquid but permits free flow of gases therethrough.

Another object is to provide a filter that opposes capillary passage of liquids therethrough.

An additional object is to provide a non-wettable coating on the filter surfaces that will be durable over relatively long periods of time.

A further object is to provide a non-wettable coating on the pore surfaces of a filter of such thickness that will not close the pores.

Still another object is to provide a filter for blocking liquids at a predetermined maximum pressure.

Another object is to provide a closed chamber having only gas communication with the exterior thereof.

Further objects and advantages of the invention will become apparent as the description proceeds.

While the scope of the invention is pointed out in particularity in the appended claims, it may best be understood from a consideration of a specific embodiment thereof taken in connection with the accompanying drawing in which:

Figure 1:
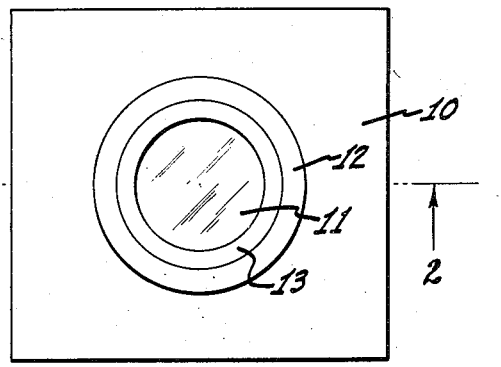
Figure 1 shows a front elevation of a closed chamber embodying the invention.
Figure 2:
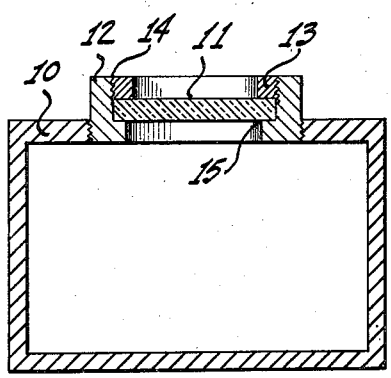
Figure 2 shows a vertical cross section along the line 2—2 of Figure 1 and depicts the mounted relationship of my novel filter and the closed chamber with which it is associated.

Referring now to the drawing which depicts for illustrative purposes only one embodiment of my invention, there is shown in Figures 1 and 2 a chamber or receptacle having walls 10 in one of which is supported an insert 11. Suitable supporting means for the insert 11 comprise a cylinder 12 in threaded engagement with the walls 10 of the of a passageway in one of the walls 10 of the chamber, and a threaded ring 13 engaging threads on the cylinder 12. The engagements between the insert 11 and the cylinder 12 and between this cylinder and a wall 10 of the chamber form air and watertight seals.

According to the invention the insert 11 constitutes a porous body made of, for example, a ceramic which has been coated or impregnated in a novel manner to render it capable of transmitting air or gases therethrough but incapable of transmitting a fluid such as water.

Receptacles of this sort can serve a variety of purposes. For example, they might be used in association with humidors for tobacco, or as a casing for radio equipment. In connection with a humidor, the receptacle may serve as a cover therefor and be filled with water with the insert 11 disposed at the bottom thereof. No water will flow from the receptacle but water vapor will enter the humidor through the insert 11 and provide desired moisture therein. As a casing for radio equipment, the receptacle is well suited for use under conditions where water would normally wash over the equipment and where an airtight casing may be undesirable because of pressure requirements or for other reasons.

While attempts have been made heretofore to condition a porous body so as to make it waterproof in the sense that it excludes the entry of water in its pores, many difficulties have been encountered. For example, one of the characteristics that the coating should possess is some degree of permanence so that the coating will persist over relatively long periods of time, say at least a year. Another feature that it should have is one that prevents it from clogging the pores by closing the relatively narrow portions thereof as by bridging opposite walls of such portions. In addition, the coating should wet the walls of the pores while being itself unwettable by a liquid such as water. So far as I am aware, no coating has been found prior to my invention that satisfies all of these variant requirements.

Thus, while paraffine will harden on the pore walls and will be relatively durable as a coating, it is difficult to prevent a clogging of the pores when applying it as a coating. With the use of paraffine as a coating the pores adjacent to the surfaces of the porous body become clogged relatively fast on the application of the coating so that the inner pores are provided with no coating at all. On the other hand, oils that do not harden as rapidly or at the same temperature as paraffine, have too low a value of persistence to be useful for the purpose indicated. Such oils dry up or evaporate relatively quickly after application as a coating on a porous body with the result that frequent re-coatings are necessary in order to preserve the water-repellent character of the body. Thus, both paraffine and oils that have a more lasting liquid phase under varying temperature conditions are impractical for use as a waterproofing coating for porous bodies.

Figure 3:
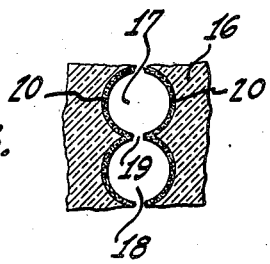
Figure 3 shows a greatly enlarged representation of two inter-communicating pore spaces that may be included in a filter body according to the present invention.

According to the invention a relatively thin coating is provided on all surfaces of the porous body insert 11, including the inner surfaces of its pores, which coating comprises a non-wettable oil of the silicone type, known to the trade as Dow-Corning Type 200 fluid, which has a viscosity of 200 centistokes at 25° C. or other silicone oils of a similar nature. Figure 3 shows on a greatly enlarged scale a portion of a pore included in the body of insert 11 after it has been coated in accordance with the invention. A porous body such as a ceramic, includes solid portions 16 shown in cross section, which define a plurality of spaces or pores 17, 18, which communicate with each other through constrictions or passageways 19. On the walls of the pores 17, is a relatively thin coating 20 of a silicone oil referred to, which has been applied according to the invention.

Silicone oil of the type referred to is well suited for use in the coating method of the invention, whereby it is thinly applied to prevent clogging of the pores. In addition, it has a high value of persistence so that its coating characteristics lasts over an appreciably long period of time, say a year or longer.

In addition to providing a novel article of manufacture in the form of a durably waterproofed porous body having a number of useful applications indicated above, the invention also provides a novel method of applying the coating to the porous body.

In accordance with the method of the invention, a porous body having pores of a desired size is soaked in a solution containing from 2 to 4% silicone oil of the type described, and 98–96% of a solvent which may comprise either carbon tetrachloride or one of the aromatic naphthas, until all surfaces of the body, including the inner surfaces of the pores, are wet with the solution. The body is then removed from the solution and drained well and baked in an oven at a temperature of from 120° C. to 160° C. for a period of from 2 to 5 hours. After this treatment a coating remains on the pore surfaces which has the desirable properties mentioned herein.

While silicone oil of the type described is known to possess waterproofing characteristics, it has not been suggested for use in an application where complete closure or clogging of the pores is undesirable. This is probably because of the fact that an application of silicone oil only, without the solvent referred to, results in the clogging of the smaller pores of a porous body. However, employing the silicone oil in the proportion indicated in a solvent of the type mentioned results in the application of a uniform and relatively thin coating of oil to all pore surfaces, which is incapable of clogging the pores. The solvent of course is driven off during the baking operation.

While the method of the invention is effective in connection with porous bodies other than ceramics, it is preferred to use porous ceramic bodies because such bodies are appreciably unaffected by oxidation, acid vapors or other usual corrosive agents that may be present when the method is being carried out. Where special applications require porous metal bodies the method of invention can always be employed to advantage.

A further aspect of the invention concerns the dimensions of the pores of a porous body.

In some applications the magnitude of these dimensions may be important. For example, if water in the liquid phase is to contact directly the porous body, the pore size of the body should be such that the pressure of the liquid is insufficient to force the liquid mechanically through the pores of the body as if they were orifices. A person skilled in the art can readily determine what pore size is suitable for a given water pressure condition.

It is apparent that the invention provides a novel gas liquid filter which effectively bars the flow of liquid therethrough while permitting the flow of gas through its pores.

It is of course understood that the foregoing description of an embodiment of my invention is presented for illustrative purposes only and that the invention is not limited thereto but possesses a scope particularly pointed out in the appended claims.

What I claim is:

1. A chamber having walls defining a confined space, at least a portion of said walls being in contact with liquid at a pressure lower than a predetermined value, means in said portion of said walls preventing passage of liquid therethrough at a pressure lower than said predetermined value, said means permitting gases to pass therethrough and comprising a body having pores therein of predetermined dimensions to block the free passage of liquid therethrough at said pressure, and an unwettable coating on the surfaces of said pores for blocking capillary passage of said liquid therethrough, said coating comprising a silicone oil having a viscosity of 200 centistokes at a temperature of about 25° C. for easy entrance into said pores and without bridging spaced ones of said surfaces, said coating being baked in situ for drying on said surfaces for prolonged adherence thereon under conditions of use.

2. A filter permitting the flow of gas therethrough but barring the flow of liquid, comprising a body having pores throughout its extent and a relatively thin coating on the walls of said pores of a silicone oil, having a viscosity of about 200 centistokes at a temperature of 25° C. said coating having substantially the same thickness in regions within said body remote from its outer surfaces, as at regions of said body close to said outer surfaces, whereby said pores remain open and said coating is durable for a relatively long period of time.

3. A filter comprising a porous medium having relatively minutely dimensioned spaces defined by the pores thereof and a durable, non-wettable and non-clogging coating on the walls of said pores comprising a dried silicone oil firmly adherent to said walls, said silicone oil when liquid having a viscosity of 200 centistokes at a temperature of 25° C. said coating on each of said walls having a depth less than one half the distance separating opposite ones of said walls.

4. A filter having surfaces wettable by water and a coating composition wetting said surfaces, said coating composition being non-wettable by water, whereby said surfaces are rendered non-wettable by water when said coating has been applied thereto, said coating composition prior to application comprising a solution including from two to four percent of a silicone oil having a viscosity of about 200 centistokes at 25° C. and 98–96 percent of one of carbon tetrachloride and the aromatic naphthas, and said coating composition subsequent to application comprising only said silicone oil in dried form for durability of the order of one year under conditions of use.

5. A filter comprising a body having pores therein and a non-wettable coating on the walls of said pores of a dried silicone oil having a viscosity when in the liquid phase of about 200 centistokes at a temperature of 25° C., whereby said coating penetrates said pores without closing the same, said silicone oil being baked in situ on the surfaces of said pores for drying, whereby said coating adheres to said pores for an extended period of the order of months under conditions of use.

LAWRENCE RUSSEL SHARDLOW.

REFERENCES CITED

The following references are of record in the file of this patent:

UNITED STATES PATENTS

| Number | Name | Date |
|---|---|---|
| 2,058,165 | McCoy | Oct. 20, 1936 |
| 2,212,162 | Littleton | Aug. 20, 1940 |
| 2,347,031 | Cupery | Apr. 18, 1944 |
| 2,353,937 | Smith | July 18, 1944 |
| 2,359,386 | Reinsch | Oct. 3, 1944 |
| 2,405,988 | Barry | Aug. 20, 1946 |
| 2,432,891 | Herney | Dec. 16, 1947 |
| 2,453,192 | Bryant | Nov. 9, 1948 |

OTHER REFERENCES

Ind. & Engineering Chemistry, vol. 39, No. 11, November 1947, pages 1366, 1369 and 1371.